US011655105B2

(12) United States Patent
Smith et al.

(10) Patent No.: US 11,655,105 B2
(45) Date of Patent: May 23, 2023

(54) APPARATUS AND METHODS FOR TRANSFERRING FRAGILE HEMS

(71) Applicant: TriDelta Systems, LLC, Abbeville, AL (US)

(72) Inventors: Benjamin Decker Smith, Abbeville, AL (US); Lawrence Allen Povlacs, Dothan, AL (US); Robert Samuel Phillips, Jr., Abbeville, AL (US)

(73) Assignee: TriDelta Systems, LLC, Abbeville, AL (US)

( * ) Notice: Subject to any disclaimer, the term of this patent is extended or adjusted under 35 U.S.C. 154(b) by 260 days.

(21) Appl. No.: 17/084,178

(22) Filed: Oct. 29, 2020

(65) Prior Publication Data

US 2022/0135340 A1     May 5, 2022

(51) Int. Cl.
   B65G 47/12     (2006.01)
   B65G 11/08     (2006.01)

(52) U.S. Cl.
   CPC ............ B65G 47/12 (2013.01); B65G 11/088 (2013.01); *B65G 2201/047* (2013.01)

(58) Field of Classification Search
   CPC ..... B65G 11/08; B65G 11/081; B65G 11/083; B65G 11/085; B65G 11/086; B65G 11/088
   See application file for complete search history.

(56) References Cited

U.S. PATENT DOCUMENTS

| 260,104 | A | | 6/1882 | Lidford | |
|---|---|---|---|---|---|
| 410,017 | A | * | 8/1889 | Phillips | F26B 17/1441 193/27 |
| 686,452 | A | * | 11/1901 | Haywood | B65G 11/026 193/4 |
| 707,297 | A | | 8/1902 | Brink | |
| 969,372 | A | | 9/1910 | Hottel | |
| 3,559,846 | A | * | 2/1971 | Hastrup | B65G 65/42 222/55 |
| 4,632,257 | A | * | 12/1986 | Negishi | A47F 1/08 248/222.52 |
| 5,086,902 | A | * | 2/1992 | Dunnigan | B65G 11/088 193/27 |
| 7,743,927 | B2 | * | 6/2010 | Svatek | B07C 5/02 193/25 FT |
| 9,492,849 | B2 | | 11/2016 | Adams et al. | |
| 9,958,301 | B2 | | 5/2018 | Kirk et al. | |

* cited by examiner

*Primary Examiner* — William R Harp
(74) *Attorney, Agent, or Firm* — Dorton & Willis, LLP (57) ABSTRACT

An apparatus for vertical transfer of whole nuts from a first elevation to a second, lower elevation includes a run extending between an entrance and an exit, and having a plurality of alternatingly arranged conveying panels between the entrance and the exit. Each conveying panel is inclined at approximately 30 degrees to horizontal and has a predefined width. The apparatus further includes arcuate turn-arounds disposed between respective conveying panels to facilitate transferring the nuts from one conveying panel to the next lower conveying panel. The predefined width of the conveying panels is selected based on a predetermined mass flow rate of nuts such that whole nuts move along the run in a continuous stream without tumbling, and wherein each nut is in contact with adjacent nuts in its respective layer.

10 Claims, 8 Drawing Sheets

APPARATUS AND METHODS FOR TRANSFERRING FRAGILE HEMS

TECHNICAL FIELD

The present invention relates generally to conveying systems and, more particularly, to apparatus and methods for transferring fragile items from a first elevation to a second, lower elevation.

BACKGROUND

Various machines and devices have been developed to facilitate harvesting and processing agricultural products such as nuts. Many such apparatus have been developed to facilitate transferring agricultural products from a first elevation to a second, lower elevation utilizing gravity. When the product to be transferred is fragile, special care must be taken to ensure that the product is not damaged during handling. For example, there is a particular market for whole nuts, such as whole peanuts, where it is important that the nuts be maintained in their whole form. One such application where whole nuts may be required is for use in the candy-making industry, for example. If nuts intended for making certain candies are split or otherwise damaged, the product loses value and cannot be used for the desired application. Accordingly, special care must be taken during the handling and transport of whole nuts to prevent such damage. Special care is also required for transporting and processing various other items. As non-limiting examples, various foodstuffs and wood pellets used for heating are fragile items that require special care during transport and handling to ensure that the items are not broken or otherwise damaged.

The need to maintain nuts or other fragile products in their whole form is counterbalanced, on the other hand, with the need to quickly and efficiently transport and feed the product through the associated handling and processing equipment. Conventional systems for transferring whole nuts from a first elevation to a second, lower elevation using gravity have typically involved spiral ramps that convey the product between the first and second elevations. These spiral ramp transfer devices are prone to becoming blocked with product if mass flow rates through the device are too high, thereby limiting the effective through-flow that these types of devices can achieve. Moreover, increasing mass flow through spiral ramp transfer devices generally requires increasing the diameter of the spiral, which may be prohibited by existing space limitations. In other applications, devices incorporating alternating panels to transfer product between the first and second elevations have been used. While attempts have been made to utilize alternating panel devices for transferring whole nuts, such as peanuts, these devices have not generally been considered to be effective for transferring whole nuts without splitting or otherwise damaging the nuts. In particular, alternating panel-type devices generally exhibit flow stoppages when the angle of inclination of the panels relative to horizontal is about 35 degrees or less, whereas splitting and other damage to the nuts occurs due to abrupt turns where sufficient velocities and angles of impact occur.

A need therefore exists for an improved transfer device that moves fragile products, such as whole nuts, quickly and efficiently, but which reduces or eliminates splitting or otherwise breaking or damaging the fragile product.

SUMMARY

The present invention provides apparatus and methods for quickly and efficiently transferring fragile products, such as whole nuts, from a first elevation to a second, lower elevation, while maintaining the integrity of the fragile product. While the apparatus and methods are described herein with particular reference to whole peanuts as the items being transferred, it will be appreciated that the apparatus and methods may alternatively be used to transfer various other fragile items from a first elevation to a second, lower elevation.

In one aspect, an apparatus for vertical transfer of whole nuts from a first elevation to a second, lower elevation includes a run extending between an entrance and an exit, and having a plurality of alternatingly arranged conveying panels between the entrance and the exit. Each conveying panel is inclined at approximately 30 degrees to horizontal and has a predefined width. The apparatus further includes arcuate turn-arounds disposed between respective conveying panels to facilitate transferring the nuts from one conveying panel to the next lower conveying panel. The predefined width of the conveying panels is selected based on a predetermined mass flow rate of nuts such that whole nuts move along the run in a continuous stream without tumbling, and wherein each nut is in contact with adjacent nuts in its respective layer.

In another aspect, the apparatus may further include a sensor engaging the run and supporting at least part of the weight of the apparatus. The sensor is configured to detect a force related to product moving along the run, whereby the mass flow of nuts being transferred by the apparatus may be determined based on the detected force. In another aspect, a method of making an apparatus for vertically transferring whole nuts from a first elevation to a second, lower elevation includes forming a run having an entrance, an exit, and a plurality of alternatingly arranged conveying panels between the entrance and exit. Each conveying panel is inclined at approximately 30 degrees to horizontal and has a predefined width that is selected based on a predetermined mass flow rate of nuts through the run such that whole nuts move along the run in a continuous stream without tumbling, and wherein each nut is in contact with adjacent nuts in its respective layer.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the present invention.

DETAILED DESCRIPTION

Figure 1:
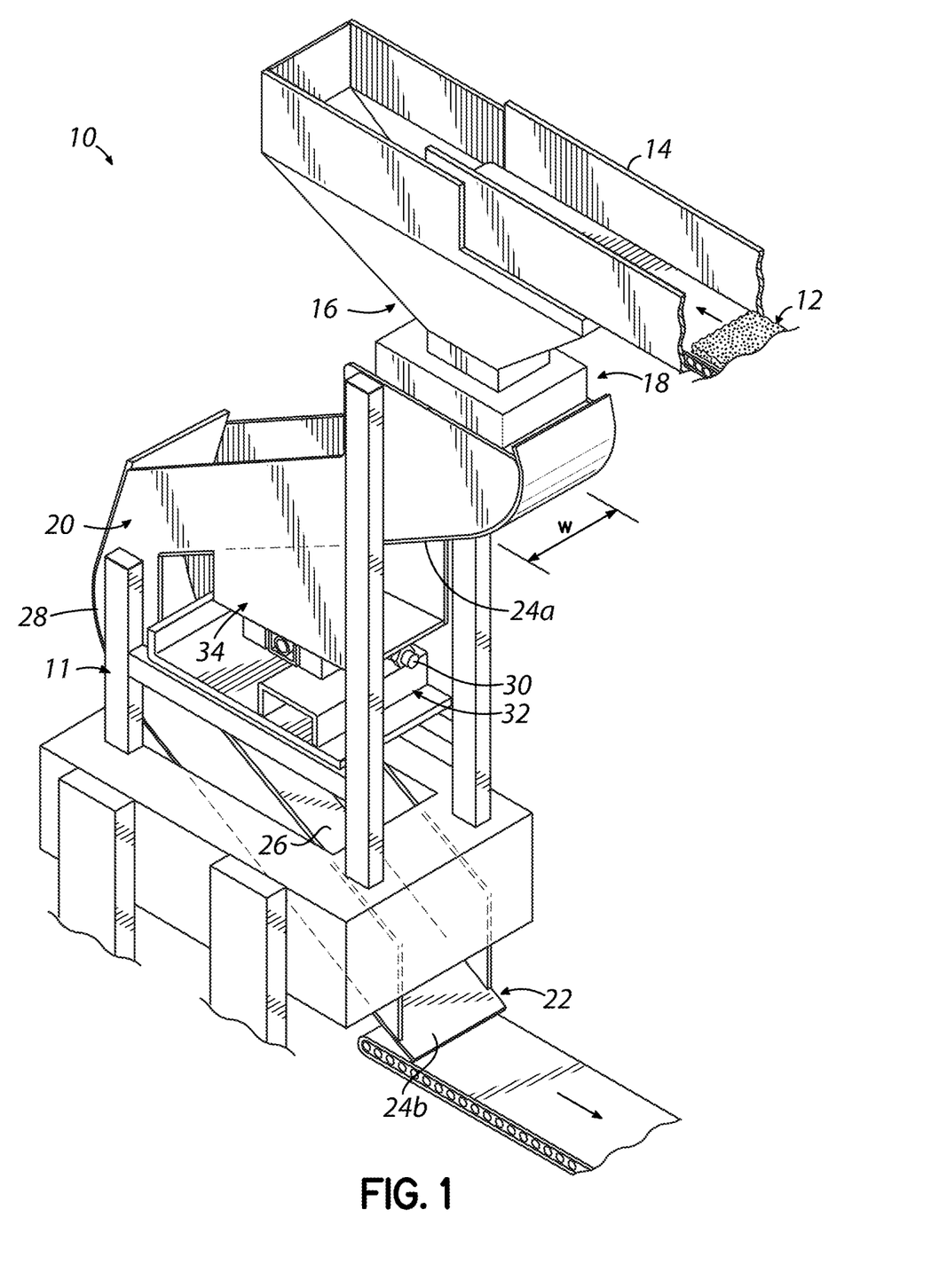
FIG. 1 is a perspective view of an exemplary apparatus for transferring whole nuts from a first elevation to a second, lower elevation in accordance with the principles of the present disclosure.

FIG. 1 depicts an exemplary apparatus 10 for transferring fragile items from a first elevation to a second, lower elevation. The apparatus 10 is particularly useful for transferring whole nuts, such as whole peanuts. It will be appreciated, however, that the apparatus 10 may alternatively be used to transfer other fragile items and, while the discussion herein is focused on peanuts, the principles of this disclosure are applicable to various other fragile items as well. The exemplary apparatus 10 is depicted in FIG. 1 in a typical installation within a processing plant where it may be supported, at least in part, by framework 11 within the plant. In the embodiment shown, whole nuts 12 are received from a supply and directed by an infeed conveyor 14 into a hopper 16 positioned adjacent an entrance 18 of the transfer apparatus 10, whereby a substantially constant feed of whole nuts 12 may be directed into the entrance 18 of the transfer apparatus 10 from the hopper 16. The transfer apparatus 10 includes a run 20 that extends between the entrance 18 and an exit 22 provided at the second elevation. The run 20 includes several alternatingly arranged conveying panels 24a, 24b upon which the nuts 12 are transferred from the first elevation to the second elevation under the force of gravity. The conveying panels 24a, 24b have a generally planar conveying surface 26 upon which the nuts 12 are received near an upper portion thereof, and are inclined relative to horizontal so that the nuts 12 slide down the conveying surface 26 under the influence of gravity toward a lower portion, whereafter the nuts 12 are directed to the next lower conveying panel 24b.

The apparatus 10 further includes one or more turnarounds 28 disposed between adjacently positioned conveying panels 24a, 24b so that nuts 12 leaving the lower portion of one conveying panel 24a are engaged by the turnaround 28 and are directed onto the upper portion of the next lower conveying panel 24b. The transfer apparatus 10 may have additional turnarounds 28 and conveying panels 24a, 24b to achieve a desired transfer height, as discussed more fully below. In the embodiment shown, the turnaround 28 transitions directly into the next successive conveying panel 24b. It will be appreciated, however, that turnarounds may alternatively comprise separate components that are joined with or positioned adjacent the next successive conveying panel.

Transfer apparatus in accordance with the principles of the present disclosure may be fabricated using any suitable material. In some embodiments, the transfer apparatus, including the conveying panels and turnarounds, may be formed from mild steel, which facilitates manufacture of the transfer apparatus using conventional manufacturing methods. In other embodiments, applications may require the use of particular material. For example, stainless steel may be used to fabricate a transfer apparatus intended for use with food products. Various other materials may be used as will be appreciated by persons skilled in the art.

With continued reference to FIG. 1, the transfer assembly 10 further includes at least one sensor 30 positioned to engage the run 20 and supporting at least part of the weight of the transfer apparatus 10. In the embodiment shown, the sensor 30 is fixed to the framework 11 by suitable support structure 32, and engages the run 20 through a bracket assembly 34. The sensor 30 is configured to detect a force related to the mass of items moving along the run, whereby the mass flow rate of items, such as whole peanuts 12, though the transfer apparatus 10 can be determined. For example, the sensor 30 may be configured to detect a net vertical force on the apparatus 10 due to the mass of items moving along the run 20.

Through experimentation with runs of different configurations and having conveying panels arranged at different inclinations, the inventors discovered that the mass flow rate of whole nuts moving along the run can be increased without splitting or otherwise damaging the whole nuts when the nuts are moved by gravity in a continuous stream without gaps between individual nuts and without tumbling, such that each nut is in contact with respective nuts adjacent to it. It was further discovered that whole peanuts could be moved along a run having conveying panels inclined at about 30 degrees at an average speed of about 300 feet/minute while staying together in a continuous stream without tumbling, thereby maintaining the whole condition of the peanuts. The average speed of 300 feet/minute was thus determined to be the optimum speed for transferring whole peanuts in a continuous stream without damaging the peanuts. In a similar manner, the optimum speed for transferring other items can be experimentally determined by transferring the items at different speeds and observing the transferred items with respect to quality, such as whether the item has incurred damage.

In the exemplary embodiment of FIG. 1, each conveying panel 24a, 24b is inclined at an angle with respect to horizontal of approximately 30 degrees. As used herein, approximately 30 degrees takes into consideration that the actual angle may vary slightly due to manufacturing tolerances and/or the positioning of the transfer apparatus 10 within the particular application in which it is used. The conveying panels 24a, 24b further have a predefined width W that is selected based upon a desired mass flow rate of whole nuts 12, such that the whole nuts 12 move along the run 20 in a continuous stream without tumbling, and wherein each nut 12 is in contact with adjacent nuts 12 in its respective layer. The width W of conveying panels 24a, 24b in the run 20 can thus be determined to achieve a desired mass flow rate of nuts 12 once the optimum speed for transferring the nuts 12 without splitting or otherwise causing damage has been determined. The width W of the conveying panels 24a, 24b for the transfer apparatus 10 can be determined from the equation:

$$W = \frac{Q}{\rho * S * H}$$

wherein:
W is the width of the conveying panels;
Q is the desired mass flow rate of nuts;

ρ is the density of the nuts being transferred;

S is the optimum speed for the nuts being transferred; and

H is the height of nuts in the continuous stream.

For example, when the desired mass flow rate for transferring peanuts (density=35 lb/cubic foot) with a stream height of 1 inch is 2000 pounds/minute, the width of the conveying panels is determined to be:

$$W = \frac{\left(2000 \frac{\text{lb}}{\text{min}}\right)}{\left(35 \frac{\text{lb}}{\text{ft}^3}\right) * \left(300 \frac{\text{ft}}{\text{min}}\right) * \left(1 \text{ in} * \frac{1 \text{ ft}}{12 \text{ in}}\right)}$$

$$W = 2.286 \text{ feet (27.4 inches)}$$

Figure 2:
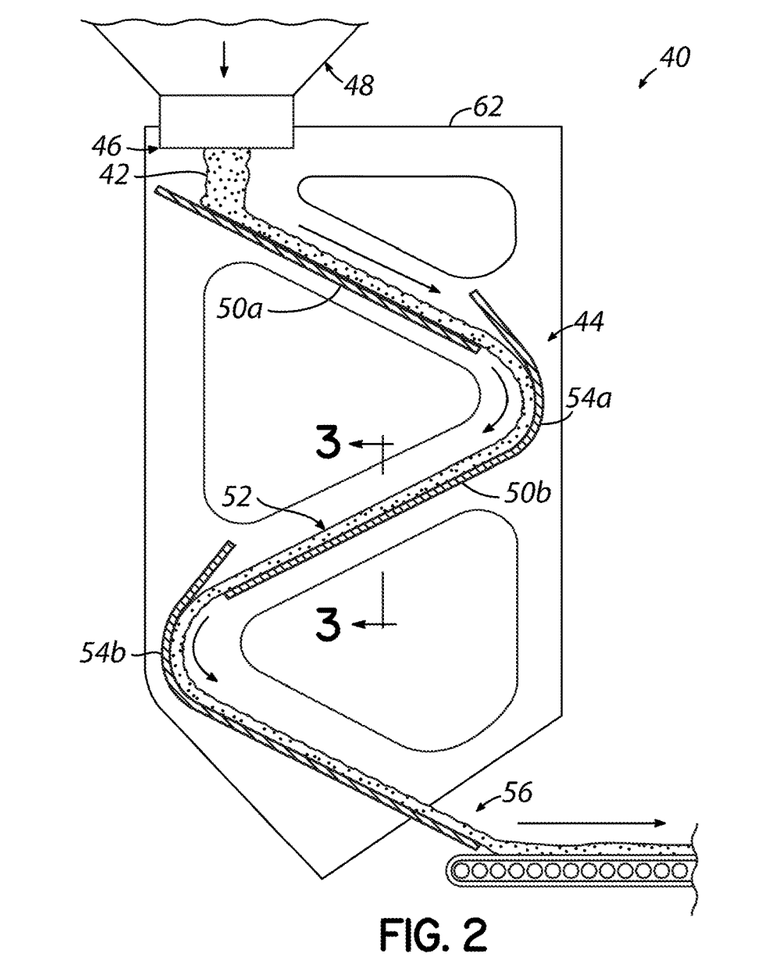
FIG. 2 is cross-sectional view of another exemplary transfer apparatus, illustrating operation to transfer whole nuts.

FIG. 2 depicts an exemplary transfer apparatus 40 in cross-section and illustrates operation of the apparatus 40 to move whole nuts 42 along the run 44 from the first elevation to the second elevation. A steady supply of whole nuts 42 is provided to the entrance 46 of the run 44 from a hopper 48 and are received proximate an upper portion of a first conveying panel 50a. The first conveying panel 50a is inclined relative to horizontal so that the whole nuts 12 are moved under the force of gravity down the generally planar conveying surface of the conveying panel 50a in a continuous stream 52 without gaps between individual nuts 42 and without tumbling. At the lower portion of the first conveying panel 50a, the stream 52 of whole nuts 42 is transferred into engagement with a first turnaround 54a disposed adjacent the lower portion of the first conveying panel 50a. The first turnaround 54a has a generally arcuate shape and is configured to receive the continuous stream 52 of nuts 42 such that the surface of the turnaround 54a engages the stream 52 of nuts 42 substantially along a tangent to the moving stream 52 and gently turns the stream 52 toward a second conveying panel 50b having an inclination in a direction opposite that of the first conveying panel 50a. The continuous stream 52 of nuts 42 then moves down the second conveying panel 50b under the force of gravity until it is in turn transferred into engagement with a second turnaround 54b disposed adjacent the lower portion of the second conveying panel 50b in the same manner as described above.

By engaging the stream 52 of nuts 42 substantially along a tangent to the direction of travel, the turnaround 54a slows the stream 52 and effectively limits the speed and impact forces on the nuts 42. In one embodiment, the turnarounds 54a, 54b have a radius of curvature of approximately 6 inches when the items being transferred are whole peanuts.

Additional conveying panels and turnarounds may be provided as may be desired in order to transfer whole nuts 42 from the first elevation to the second elevation, whereafter the nuts 42 are directed through the exit 56 of the run 44. It has been observed that, with sufficient inclination of the conveying panels 50a, 50b, a continuous stream 52 of whole nuts 42 moving along the run 44 of a transfer apparatus 40 in accordance with the present disclosure will increase in speed until a maximum speed is reached; effectively achieving a "terminal velocity" of the continuous stream 52 of nuts 42. Advantageously, a transfer apparatus 10, 40 according to the present disclosure may be configured to accommodate a given transfer height though proper selection of the number of conveying panels 24a, 24b, 50a, 50b and turnarounds 28, 54a, 54b.

Figure 3:
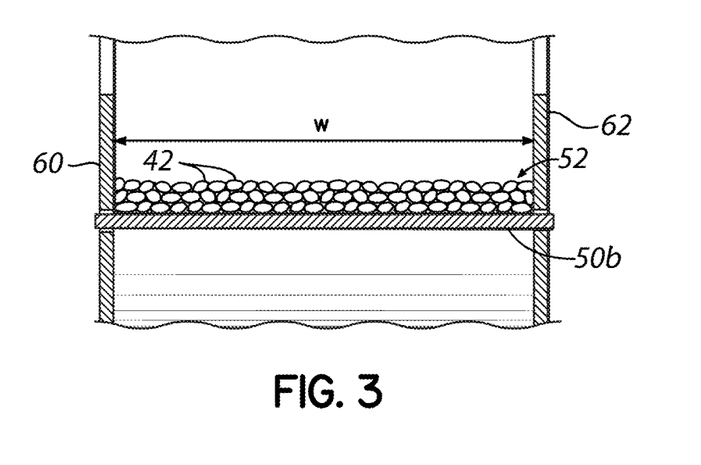
FIG. 3 is a section view taken along line 3-3 of FIG. 2.
Figure 4:
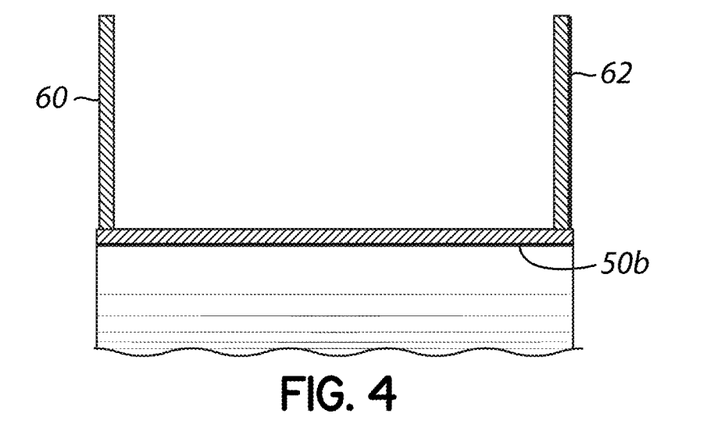
FIG. 4 is a section view similar to FIG. 3, illustrating an alternative embodiment of a transfer apparatus in accordance with the principles of the present disclosure.
Figure 5:
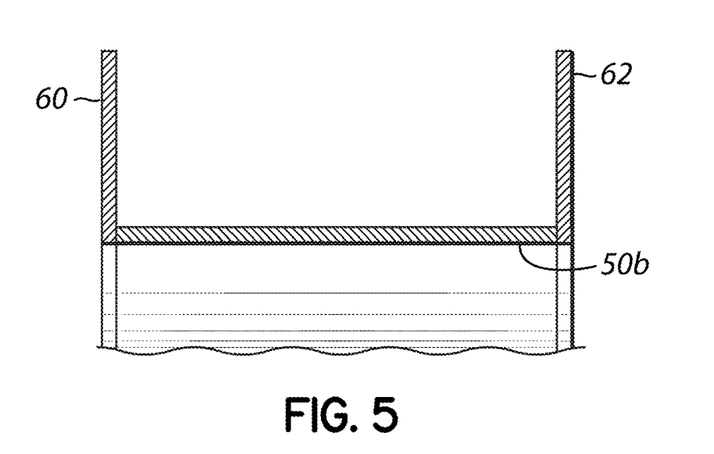
FIG. 5 is a section view similar to FIG. 3, illustrating a second alternative embodiment of a transfer apparatus.
Figure 6:
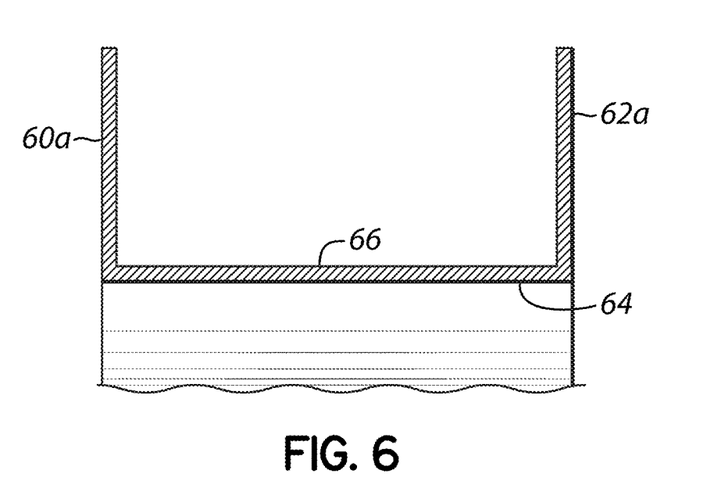
FIG. 6 is a section view similar to FIG. 3, illustrating a third alternative embodiment of a transfer apparatus.

To facilitate maintaining the stream 52 of whole nuts 42 in contact with one another as the nuts 42 are transferred between the first elevation and the second elevation, the transfer apparatus 40 further includes first and second oppositely disposed sidewalls 60, 62 adjacent the lateral sides of the conveying panels 50a, 50b and defining the predetermined width W therebetween, as illustrated in FIG. 3. FIG. 3 also illustrates a continuous stream 52 comprising several layers of whole nuts 42 moving along the conveying panel 50b. It has been observed that a continuous stream 52 of whole nuts 42 can be transferred along the run when the stream 52 comprises one to about 5 layers of nuts 12, without creating gaps between the nuts 12. In some embodiments, the first and second sidewalls 60, 62 may comprise separate components that are joined with the conveying panels 50a, 50b to define the predetermined width W. FIGS. 4 and 5 illustrate embodiments wherein first and second oppositely disposed sidewalls 60, 62 are joined with the conveying panels 50b, such as by welding or other suitable methods. In other embodiments, the first and second sidewalls 60a, 62a may be formed by bending the lateral sides of a conveying panel 64 in a direction substantially perpendicular to the generally planar conveying surface 66 of the conveying panel 64, as depicted in FIG. 6.

Figure 7:
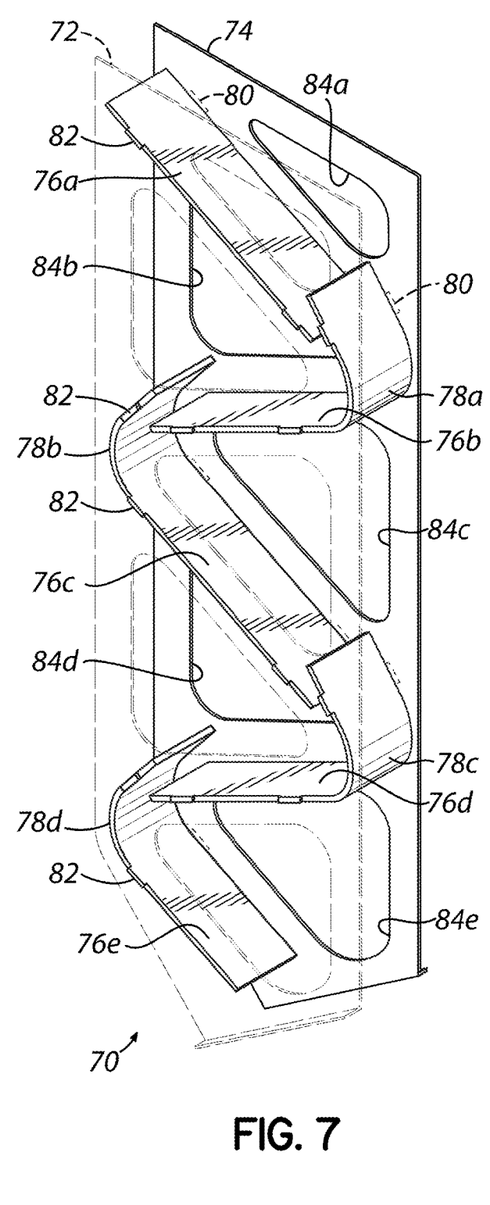
FIG. 7 is perspective view of another exemplary transfer apparatus illustrating alternative construction features.
Figure 8:
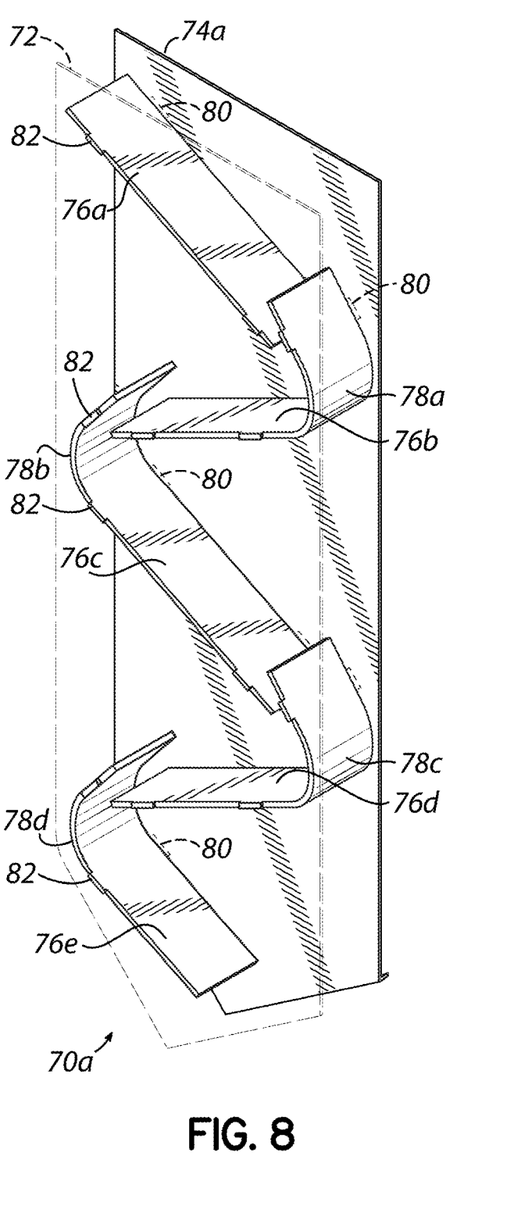
FIG. 8 is perspective view of an exemplary transfer apparatus similar to FIG. 7 and illustrating additional alternative construction features.

FIGS. 7 and 8 illustrate embodiments of exemplary transfer apparatus 70, 70a wherein the first and second sidewalls may be formed by spaced apart plates 72, 74, 72a, 74a provided on the opposing lateral sides of the conveying panels 76a-76e, such that the conveying panels 76a-76e and turnarounds 78a-78d are sandwiched therebetween. In these embodiments, slots 80 are provided in the plates 72, 74, 72a, 74a that form the first and second sidewalls, and corresponding tabs 82 are provided on the side edges of the conveying panels 76a-76e and turnarounds 78a-78d. Advantageously, the tabs 82 may be received in the slots 80 when the conveying panels 76a-76e and turnarounds 78a-78d are sandwiched between the plates 72, 74, 72a, 74a, whereby the conveying panels 76a-76e and turnarounds 78a-78d are supported by the plates 72, 74, 72a, 74a that form the first and second sidewalls and are fixed in position within the run in the assembled transfer apparatus 70, 70a. Advantageously, the plates 72, 74, 72a, 74a can be used with conveying panels 76a-76e and turnarounds 78a-78d having widths selected to provide the predetermined width W discussed above for providing a desired mass flow rate.

The transfer apparatus 70 shown in FIG. 7 further includes a plurality of apertures 84a-84e formed in the plates 72, 74. The apertures 84a-84e are positioned and arranged so that whole nuts, or other fragile items that may be transferred with the apparatus 70, can spill though the apertures 84a-84e from the conveying panels 76a-76e when nuts begin to accumulate within the run. A transfer apparatus 70 in accordance with this embodiment is useful for filling storage bins or containers, where transferred items begin to accumulate at the exit of the run as the container becomes filled. As the level of transferred items rises in the container and on the conveying panels 76a-76e, the items spill though the apertures 84a-84e and envelop the transfer apparatus 70.

Figure 9A:
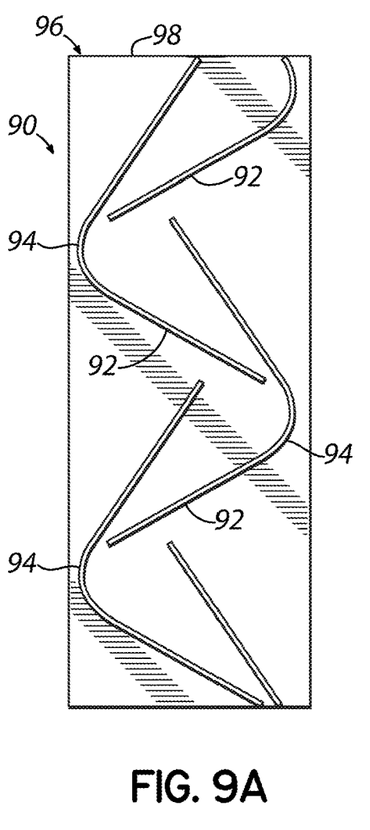
FIGS. 9A and 9B are schematic drawings illustrating an exemplary transfer apparatus having modular sections.
Figure 9B:
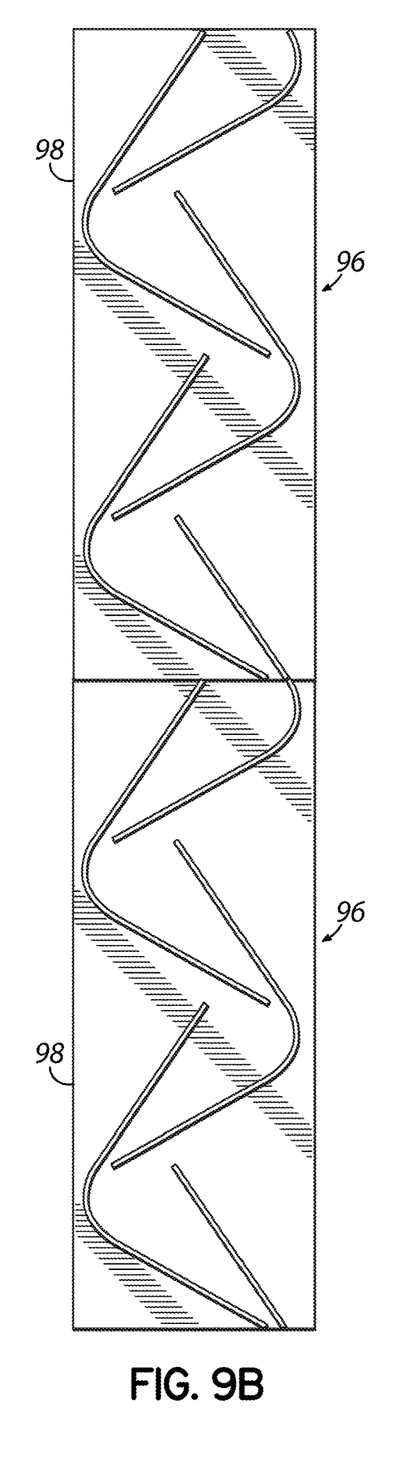
Figure 10:
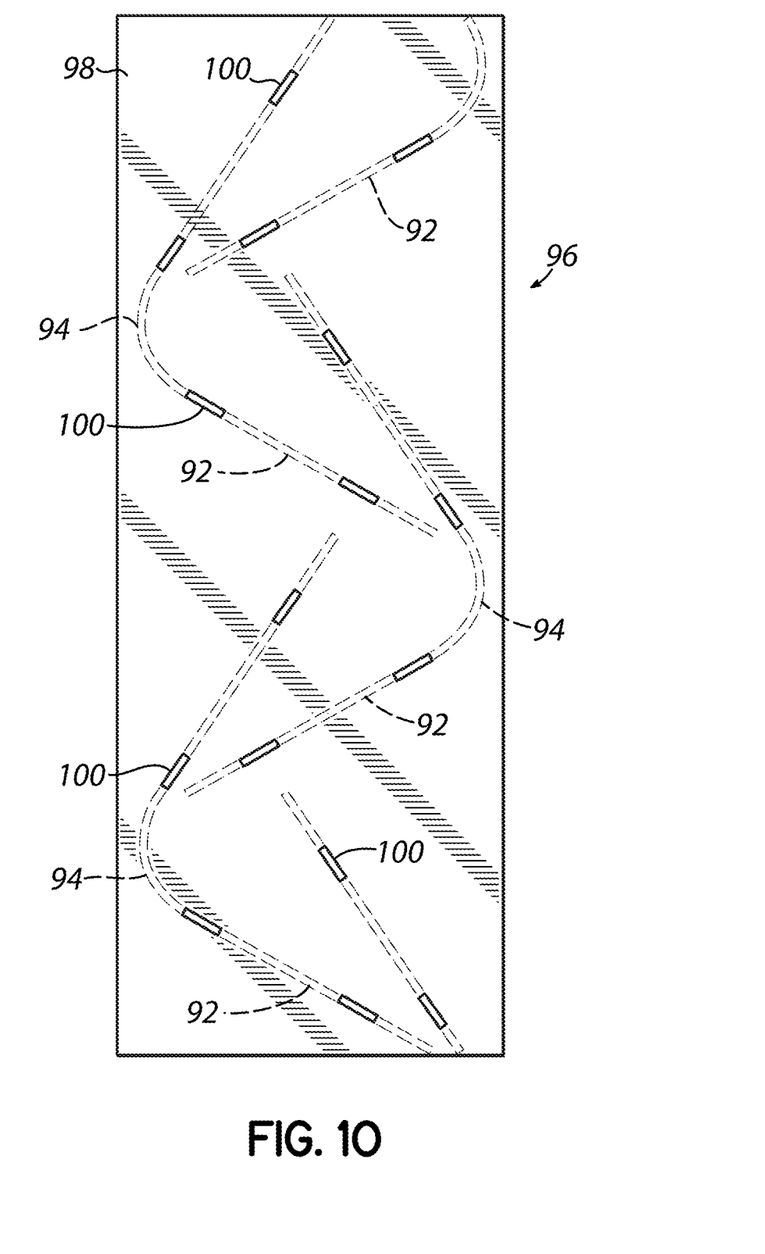
FIG. 10 is a front view of another exemplary transfer apparatus, similar to FIGS. 9A and 9B, formed using an alternative construction.
Figure 11:
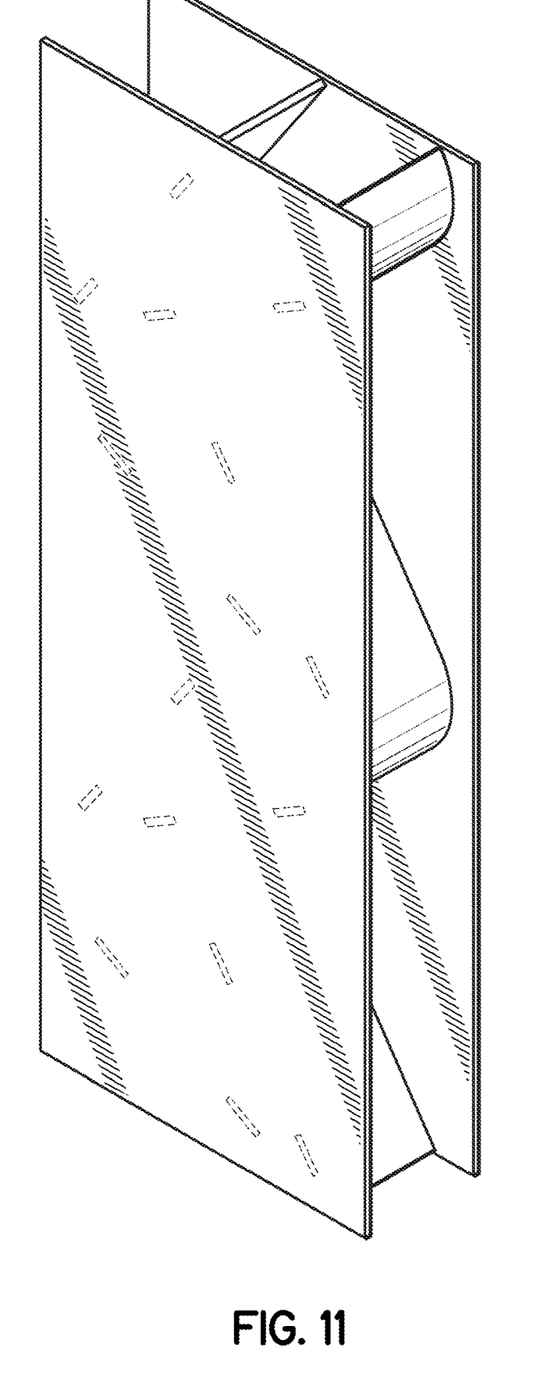
FIG. 11 is a perspective view depicting an ornamental design of a transfer apparatus in accordance with the present disclosure.
Figures 12, 15:
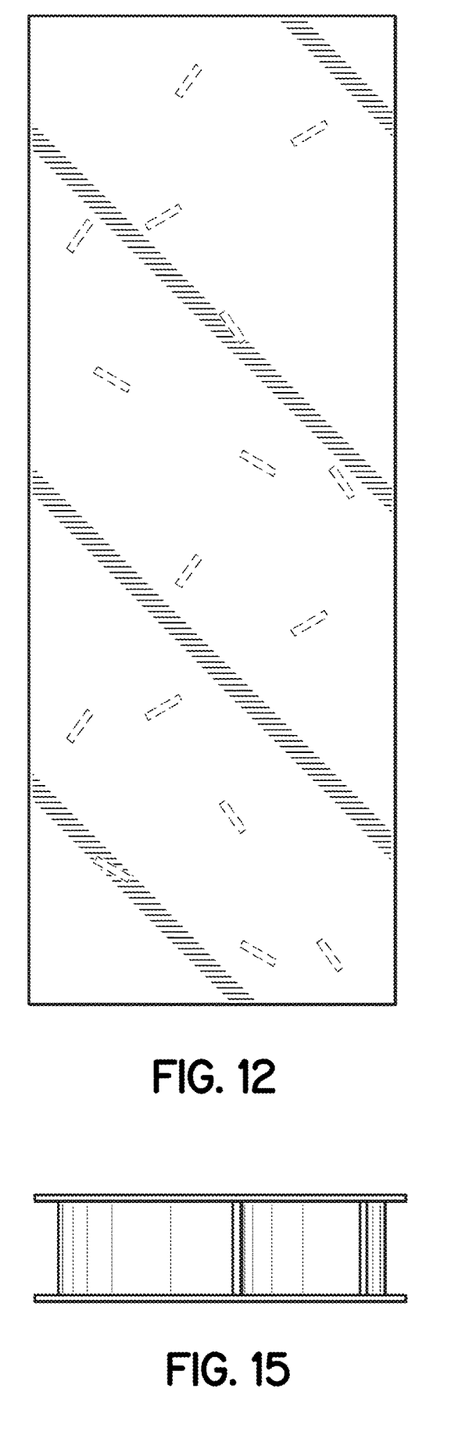
FIGS. 12-16 are front, left, right, top, and bottom views of the transfer apparatus of FIG. 11.
Figure 13:
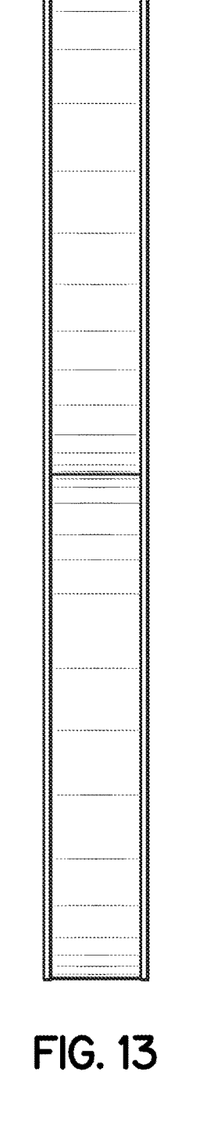
Figure 14:
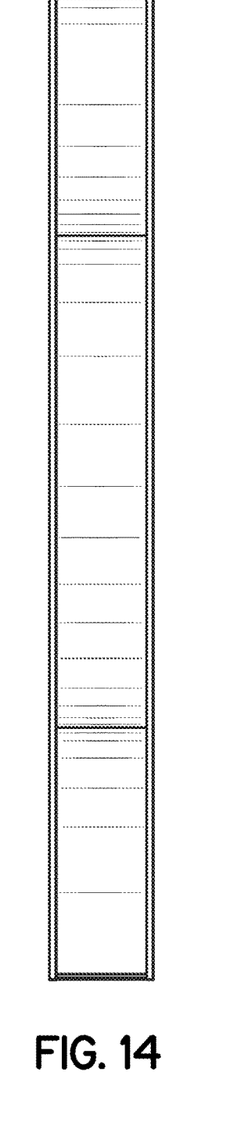
Figure 16:
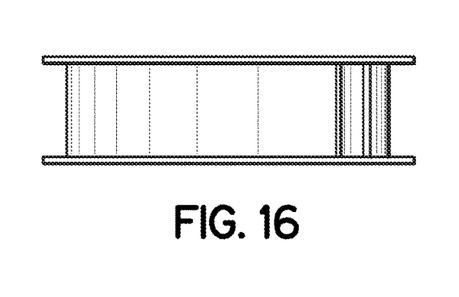

In another embodiment, sections of runs that make up the transfer apparatus can be constructed in modular form so that the transfer apparatus can be configured to accommodate various heights for transferring fragile items by adding or removing modules as appropriate. FIG. 9A depicts an exemplary run section 90 wherein the conveying panels 92 and turnarounds 94 are positioned and arranged to facilitate joining the run section 90 with an adjacent run section, as depicted in FIG. 9B, so that the conveying panels 92 and turnarounds 94 align to provide a continuous length of run. A module 96 comprising a run section 90 having one or more conveying panels 92 and associated turnarounds 94 can be formed by sandwiching the conveying panels 92 and turnarounds 94 between oppositely disposed plates 98 that define the first and second sidewalls, using tabs and slots, for example, to support the conveying panels 92 and turnarounds 94 as described above. Individual modules 96 may be joined together to define a series of alternating conveying panels that form a continuous run between an entrance positioned at a first elevation, and an exit at a lower second elevation. FIG. 10 shows the exemplary module 96 of FIG. 9A in assembled form with a plate 98 covering the conveying panels 92 and depicts the alignment of the conveying panels 92 and turnarounds 94 with the corresponding slots 100 formed in the plate 98.

FIGS. 11-16 depict various views of an ornamental design of a transfer apparatus in accordance with the present disclosure. In the embodiment shown, the ornamental design corresponds to the modular run section described above with reference to FIGS. 9A, 9B, and 10. It will be appreciated, however, that various other configurations incorporating selected features shown and described with respect to other embodiments herein may be additionally or alternatively used in an ornamental design in accordance with the present disclosure.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit and scope of the general inventive concept.

What is claimed is:

1. An apparatus for vertical transfer of whole nuts from a first elevation to a second, lower elevation, the apparatus comprising:
    a run extending between an entrance and an exit, and including a plurality of alternatingly arranged conveying panels;
    each conveying panel inclined at approximately 30 degrees to horizontal and having a predefined width;
    at least one arcuate turn-around disposed between respective conveying panels;
    the predefined width selected based on a predetermined mass flow rate of nuts such that whole nuts move along the run in a continuous stream without tumbling, and wherein each nut is in contact with adjacent nuts in its respective layer;
    wherein the predefined width is determined from:

$$W = \frac{Q}{\rho * S * H}$$

wherein:
        W is the width of the conveying panels;
        Q is the desired mass flow of nuts;
        ρ is the density of the nuts being transferred;
        S is the optimum speed for the nuts being transferred; and
        H is the height of nuts in the continuous stream.

2. The apparatus of claim 1, wherein the continuous stream comprises between one and about five layers of whole nuts.

3. The apparatus of claim 1, further comprising first and second oppositely disposed sidewalls adjacent lateral sides of the conveying panels.

4. The apparatus of claim 3, wherein the sidewalls are formed by bending the lateral sides of the conveying panels.

5. The apparatus of claim 3, further comprising:
    a plurality of slots formed in the first and second sidewalls; and
    a plurality of laterally outwardly extending tabs on the conveying panels;
    the slots and tabs positioned and arranged such that the first and second sidewalls support the conveying panels when the tabs are received in corresponding slots in the first and second sidewalls.

6. The apparatus of claim 3, further comprising at least one aperture through at least one of the first or second sidewalls, the at least one aperture sized and arranged such that nuts moving along the run spill through the at least one aperture when the apparatus is used in a manner that nuts increasingly accumulate from a point adjacent the exit of the run.

7. The apparatus of claim 1, further comprising a sensor engaging the run and supporting at least part of the weight of the apparatus whereby the sensor is configured to detect a force related to product moving along the run.

8. A method of vertically transferring whole nuts from a first elevation to a second, lower elevation, the method comprising:
    providing whole nuts to a transfer apparatus having a run extending between an entrance and an exit, and including a plurality of alternatingly arranged conveying panels between the entrance and exit, each conveying panel inclined at approximately 30 degrees to horizontal and having a predefined width;
    wherein the predefined width of the conveying panels is selected based on a predetermined mass flow rate of nuts such that whole nuts move along the run in a continuous stream without tumbling, and wherein each nut is in contact with adjacent nuts in its respective layer.

9. The method of claim 8, further comprising:
    sensing a force related to the weight of nuts moving along the run; and
    determining a mass flow rate of nuts transferred by the apparatus based on the sensed force.

10. A method of making an apparatus for vertically transferring whole nuts from a first elevation to a second, lower elevation, the method comprising:
    forming a run comprising an entrance, an exit, and a plurality of alternatingly arranged conveying panels between the entrance and exit, each conveying panel inclined at approximately 30 degrees to horizontal and having a predefined width;
    wherein the predefined width of the conveying panels is selected based on a predetermined mass flow rate of nuts through the run such that whole nuts move along the run in a continuous stream without tumbling, and wherein each nut is in contact with adjacent nuts in its respective layer; and
    determining the predefined width according to:

$$W = \frac{Q}{\rho * S * H}$$

wherein:
W is the width of the conveying panel;
Q is the desired mass flow of nuts;
ρ is the density of the nuts being transferred;
S is the optimum speed for the nuts being transferred; and
H is the height of nuts in the continuous stream.

* * * * *